United States Patent
Higuchi

(10) Patent No.: US 8,547,714 B2
(45) Date of Patent: Oct. 1, 2013

(54) OUTPUT INVERTER FOR SINGLE PHASE AND OUTPUT CURRENT DETECTING METHOD THEREOF

(75) Inventor: Masato Higuchi, Kitakyushu (JP)

(73) Assignee: Kabushiki Kaisha Yaskawa Denki, Kitakyushu-shi (JP)

(*) Notice: Subject to any disclaimer, the term of this patent is extended or adjusted under 35 U.S.C. 154(b) by 667 days.

(21) Appl. No.: 12/161,066

(22) PCT Filed: Dec. 25, 2006

(86) PCT No.: PCT/JP2006/325742
§ 371 (c)(1),
(2), (4) Date: Jul. 16, 2008

(87) PCT Pub. No.: WO2007/083486
PCT Pub. Date: Jul. 26, 2007

(65) Prior Publication Data
US 2010/0165687 A1   Jul. 1, 2010

(30) Foreign Application Priority Data
Jan. 17, 2006  (JP) ................. 2006-008285

(51) Int. Cl.
*H02H 7/122* (2006.01)
*H02H 9/02* (2006.01)

(52) U.S. Cl.
USPC .............. 363/56.04; 361/93.9; 361/93.1

(58) Field of Classification Search
USPC ............ 363/95, 97, 98, 55, 56.03, 56.04; 361/18, 93.1, 93.9; 323/908
See application file for complete search history.

(56) References Cited

U.S. PATENT DOCUMENTS 5,825,597 A * 10/1998 Young .................. 361/31
6,555,988 B2 * 4/2003 Masaki et al. ............ 318/721

FOREIGN PATENT DOCUMENTS

| JP | 2-13275 A | 1/1990 |
|---|---|---|
| JP | 2-307070 A | 12/1990 |
| JP | 6-189578 A | 7/1994 |
| JP | 7-107751 A | 4/1995 |
| JP | 9-93948 A | 4/1997 |
| JP | 19979-9-3948 A2 * | 4/1997 |
| JP | 10-28382 A | 1/1998 |
| JP | 1998-10-28382 A2 * | 1/1998 |
| JP | 2000-166247 A | 6/2000 |

(Continued)

OTHER PUBLICATIONS

Machine Translation of 1995-107751 (JP 7-107751).*

(Continued)

*Primary Examiner* — Bao Q Vu
*Assistant Examiner* — Zekre Tsehaye
(74) *Attorney, Agent, or Firm* — Sughrue Mion, PLLC

(57) ABSTRACT

There are provided an output inverter for single phase which can detect a current with high precision through a smaller number of components, and an output current detecting method thereof. A first current detector (6) is disposed between a positive electrode P side of a DC power supply and a parallel connector (1) in a first arm (8), a second current detector (7) is disposed between a negative electrode N side of the DC power supply and a parallel connector (4) in a second arm (9), a current in a first convection mode is detected by the first current detector (6), a current in a second convection mode is detected by the second current detector (7), and an output current is detected from signals output from the first current detector (6) and the second current detector (7).

3 Claims, 7 Drawing Sheets

(56) References Cited

FOREIGN PATENT DOCUMENTS

| | | |
|---|---|---|
| JP | 2001-25259 A | 1/2001 |
| JP | 200125259 A2 * | 1/2001 |
| JP | 2003-079157 A | 3/2003 |

OTHER PUBLICATIONS

Office Action issued Feb. 23, 2011, in Japanese Application No. 2007-554838.

* cited by examiner

OUTPUT INVERTER FOR SINGLE PHASE AND OUTPUT CURRENT DETECTING METHOD THEREOF

TECHNICAL FIELD

The present invention relates to an output inverter for a single phase and more particularly to an output inverter for single phase comprising a current detector and an output current detecting method thereof.

BACKGROUND ART

Related Art 1

Conventionally, there has been disclosed a method of detecting both a current flowing to a parallel connector coupled to a positive electrode side and a current flowing to a parallel connector coupled to a negative electrode side in a DC power supply of one arm, thereby detecting an output current (see e.g., Patent Document 1).

FIG. 4 is a schematic diagram showing a current detecting circuit of an inverter device according to a first related art.

In FIG. 4, numerals 61 to 66 denote parallel connectors constituted by semiconductor switching elements 11 to 16 and diodes 21 to 26, respectively. The diodes 21 to 26 are coupled in parallel with the semiconductor switching elements in reverse directions. Numerals 31 to 34 denote current detecting resistors. Numerals 41 to 44 denote amplifiers for amplifying voltages across the current detecting resistors respectively. Numeral 50 denotes an electric load coupled to output terminals U, V and W of each arm. P denotes a positive electrode of a DC bus of an inverter, and N denotes a negative electrode.

Moreover, Numeral 67 denotes an U arm, numeral 68 denotes a V arm and numeral 69 denotes a W arm, and each of the arms has two parallel connectors connected in series. Furthermore, the U arm 67 includes the current detector 31 and the current detector 32 between the positive electrode P and the parallel connector 61 and between the negative electrode N and the parallel connector 62 respectively. The W arm 69 includes the current detector 33 and the current detector 34 between the positive electrode P and the parallel connector 65 and between the negative electrode N and the parallel connector 66 respectively.

Next, an operation will be described.

FIGS. 5A to 5D are time charts to describe a current detecting operation according to the related art.

FIG. 5A shows an output current of a U phase. FIG. 5B shows a voltage across the current detecting resistor 31. FIG. 5C shows a voltage across the current detecting resistor 32.

By amplifying the voltages of the current detecting resistors 31 and 32 with the amplifiers 41 and 42 respectively and adding them with an amplifier (not shown), it is possible to obtain a current detecting signal of the U phase as shown in FIG. 5D.

More specifically, the output current of the U phase is detected by two current detecting resistors coupled to the U arm and an output current of a W phase is detected by two current detecting resistors coupled to the W arm.

Related Art 2

Moreover, there has been disclosed a method in which each arm of a three-phase inverter is provided with a current detector for detecting a current flowing to a parallel connector coupled to a negative electrode N side of a DC power supply. In this method, a current of a parallel connecting conductor on a negative electrode side of two phases having a shorter OFF time in a PWM control is simultaneously detected and set to be an output current of the inverter (see e.g., Patent Document 2).

FIG. 6 is a schematic diagram showing a current detecting circuit of an inverter device according to a second related art.

In FIG. 6, numerals 61 to 66 denote parallel connectors. Numerals 35 to 37 denote current detectors for detecting a current flowing to the parallel connectors coupled to a negative electrode N side of a DC power supply of each arm. Numeral 50 denotes an electric load coupled to an output. Numeral 71 denotes a detection phase selecting portion for selecting a detection phase. Numeral 72 denotes a current detecting portion for sampling a current detection value obtained by the selecting portion.

Next, an operation will be described.

FIG. 7 is an operational waveform diagram showing an operation according to the related art.

A carrier is compared with U-phase, V-phase and W-phase voltage commands respectively, and U-arm, V-arm and W-arm drive signals are generated. Currents flowing to the parallel connectors 62, 64 and 66 on the negative electrode N side of a U arm 67, a V arm 68 and a W arm 69 as shown in FIG. 6 are detected by the current detectors 35, 36 and 37 respectively and then are inputted to the detection phase selecting portion 71. The detection phase selecting portion 71 selects two phases having longer ON times of a semiconductor switching device on the negative electrode N side of a DC power supply and then inputs the two phases to the current detecting portion 72. The current detecting portion 71 simultaneously performs sampling on conducting currents of the selected two phases based on a sample timing signal and then sets them as output currents of the selected phases.

Patent Document 1: JP-A-2000-166247
Patent Document 2: JP-A-2003-79157

DISCLOSURE OF THE INVENTION

Problems To Be Solved

An inverter for single phase can be constituted by two of three arms of the three-phase inverter device disclosed in the first related art. However, for example, when the inverter for single phase is constituted by U and V arms, there is a problem in that short-circuit currents in upper and lower arm, which are caused by a malfunction of the semiconductor switching element, cannot be detected because the V arm has no current detector. Moreover, when the inverter for single phase is constituted by the U and W arms, four current detectors in total are required. For this reason, there is a problem in that a cost is increased.

Besides, when the current detecting circuit of the three-phase inverter disclosed in the second related art is applied to the output inverter for single phase, only a current in a second convection mode can be detected, which flows back via the parallel connector and the negative electrode N side of the DC power supply. For this reason, there is a problem in that precision in detection becomes low.

Accordingly, the present invention is made in view of the above, and it is an object of the present invention to provide an output inverter for single phase having a high reliability and an output current detecting method thereof. The output inverter is provided with a small number of components, is inexpensive and can detect a current with high precision. Furthermore, the output inverter can detect a short-circuit current even if an arm short circuit is generated due to a noise.

Means For Solving the Problems

In order to solve the above problems, the present invention has the following features. According to a first aspect of the present invention, an output inverter for single phase comprises:

a first arm coupled to positive and negative electrodes of a DC power supply, the first arm comprising:
  two first parallel connectors coupled in series, each of the first parallel connectors comprising:
    a semiconductor switching element; and
    a diode coupled in parallel in a reverse direction with the semiconductor switching element, and
  a first current detector coupled to one of the first parallel connectors and the positive electrode of the DC power supply, wherein the first current detector detects a current in a first convection mode, which flows back through the first parallel connector coupled to the first current detector, and an overcurrent caused by a short circuit of the first arm, a second arm coupled to the positive and negative electrodes of the DC power supply and coupled in parallel with the first arm, the second arm comprising:
  two second parallel connectors coupled in series, each of the second parallel connectors comprising:
    a semiconductor switching element; and
    a diode coupled in parallel in a reverse direction with the semiconductor switching element, and
  a second current detector coupled to one of the second parallel connectors and the negative electrode of the DC power supply, wherein the second current detector detects a current in a second convection mode, which flows back through the second parallel connector coupled to the second current detector, and an overcurrent caused by a short circuit of the second arm.

According to a second aspect of the present invention, in a method of detecting a current of an output inverter for single phase, said output inverter comprising:

a first arm coupled to positive and negative electrodes of a DC power supply, the first arm comprising:
  two first parallel connectors coupled in series, each of the first parallel connectors comprising:
    a semiconductor switching element; and
    a diode coupled in parallel in a reverse direction with the semiconductor switching element, and
  a first current detector coupled to one of the first parallel connectors and the positive electrode of the DC power supply, a second arm coupled to the positive and negative electrodes of the DC power supply and coupled in parallel with the first arm, the second arm comprising:
  two second parallel connectors coupled in series, each of the second parallel connectors comprising:
    a semiconductor switching element; and
    a diode coupled in parallel in a reverse direction with the semiconductor switching element, and
  a second current detector coupled to one of the second parallel connectors and the negative electrode of the DC power supply, said method comprises:
(a) detecting a current in a first convection mode, which flows back through the first parallel connector coupled to the first current detector, and an overcurrent caused by a short circuit of the first arm, using the first current detector; and
(b) detecting a current in a second convection mode, which flows back through the second parallel connector coupled to the second current detector, and an overcurrent caused by a short circuit of the second arm, using the second current detector According to a third aspect of the present invention, the method further comprises:
(c) comparing a first output voltage command for giving a command of a voltage of the first arm with a carrier for generating a PWM signal, thereby generating a first arm drive signal for driving the semiconductor switching element of the first arm;
(d) comparing a second output voltage command for giving a command of a voltage of the second arm with the carrier, thereby generating a second arm drive signal for driving the semiconductor switching element of the second arm; and
(e) performing sampling on the current in the first convection mode at the lowest point of the carrier; and
  (f) performing sampling on the current in the second convection mode at the highest point of the carrier.

Advantage of the Invention

According to the first aspect of the invention, there is employed the structure in which one current detector is provided every arm. Therefore, the structure has a smaller number of components and is more inexpensive than that in the related art. Moreover, each arm is provided with the current detector, and thus upper and lower arm short-circuit currents and a ground current can also be detected. Therefore, it is possible to implement an output inverter for single phase having a high reliability.

According to the second aspect of the invention, there is timing when the current is detected twice in one cycle of a carrier. Therefore, it is possible to detect a current with high precision in a short detecting cycle.

Figure 1:
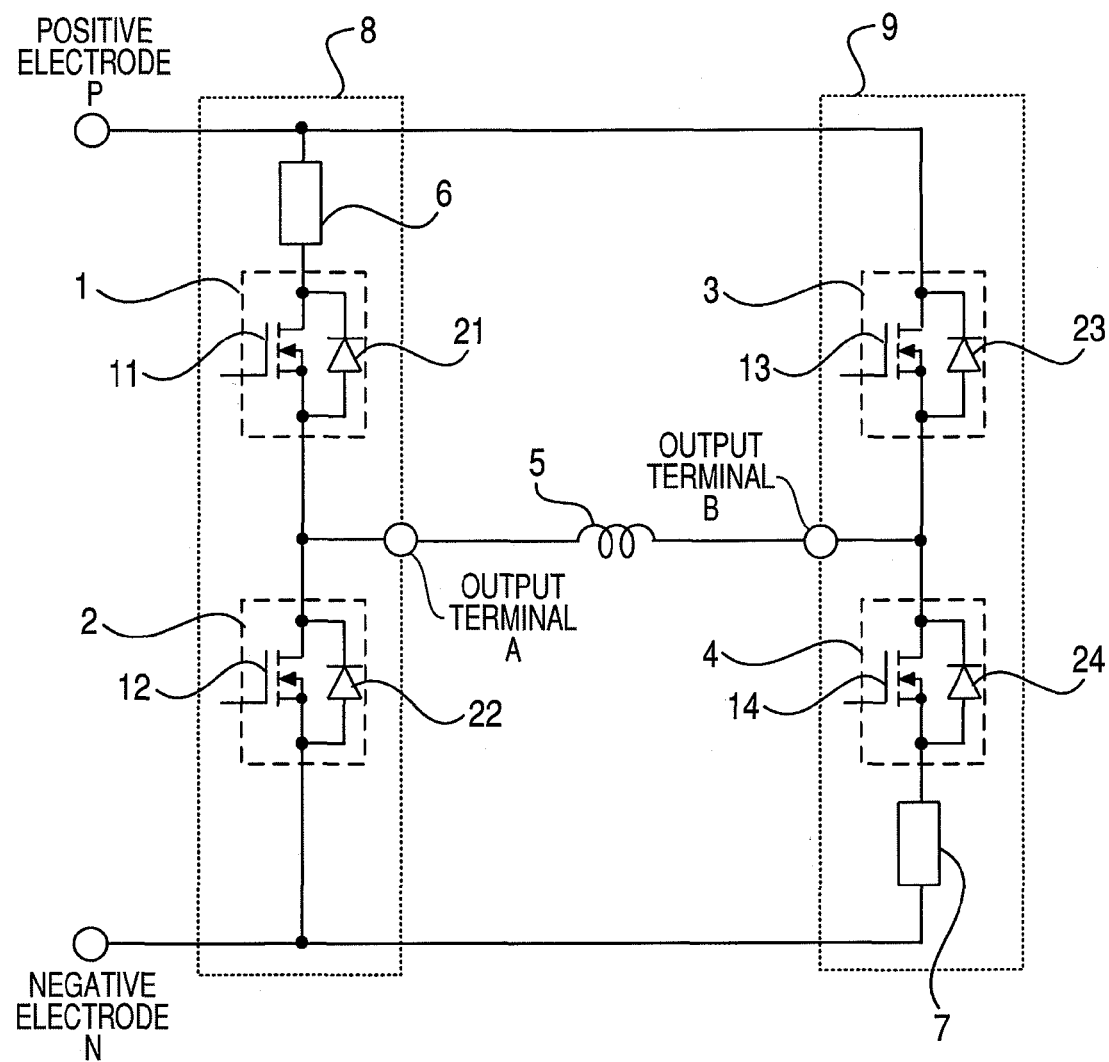
FIG. 1 is a circuit diagram of an output inverter for single phase according to an embodiment of the present invention.

DESCRIPTION OF THE DESIGNATIONS 1 to 4 parallel connector
11 to 14 semiconductor switching element
15, 16 semiconductor switching element
21 to 24 diode
25, 26 diode
31 to 34 current detecting resistor
35 to 37 current detector
41 to 44 amplifier
5, 50 electric load
6 first current detector
7 second current detector 61 to 66 parallel connector
67 U-arm
68 V-arm
69 W-arm
71 detection phase selecting portion
72 current detecting portion
8 first arm
9 second arm

BEST MODE FOR CARRYING OUT THE INVENTION

The present invention will be described with reference to the drawings hereinafter.

FIRST EMBODIMENT

FIG. 1 is a circuit diagram of an output inverter for single phase according to an embodiment of the present invention.

In FIG. 1, P denotes a positive electrode side of a DC power supply. N denotes a negative electrode side of the DC power supply. Numerals 1 to 4 denote parallel connectors including semiconductor switching elements 11 to 14 and diodes 21 to 24, respectively. The diodes 21 to 24 are coupled with semiconductor switching elements 11 to 14 in parallel in reverse directions, respectively. Numeral 5 denotes an electric load coupled between output terminals A and B. Numeral 6 denotes a first current detector, and numeral 7 denotes a second current detector. Moreover, numeral 8 denotes a first arm constituted by the parallel connectors 1 and 2, and numeral 9 denotes a second arm constituted by the parallel connectors 3 and 4.

Next, an operation will be described hereinafter.

First of all, description will be given to a flow of a current in each operating mode.

Figure 2:
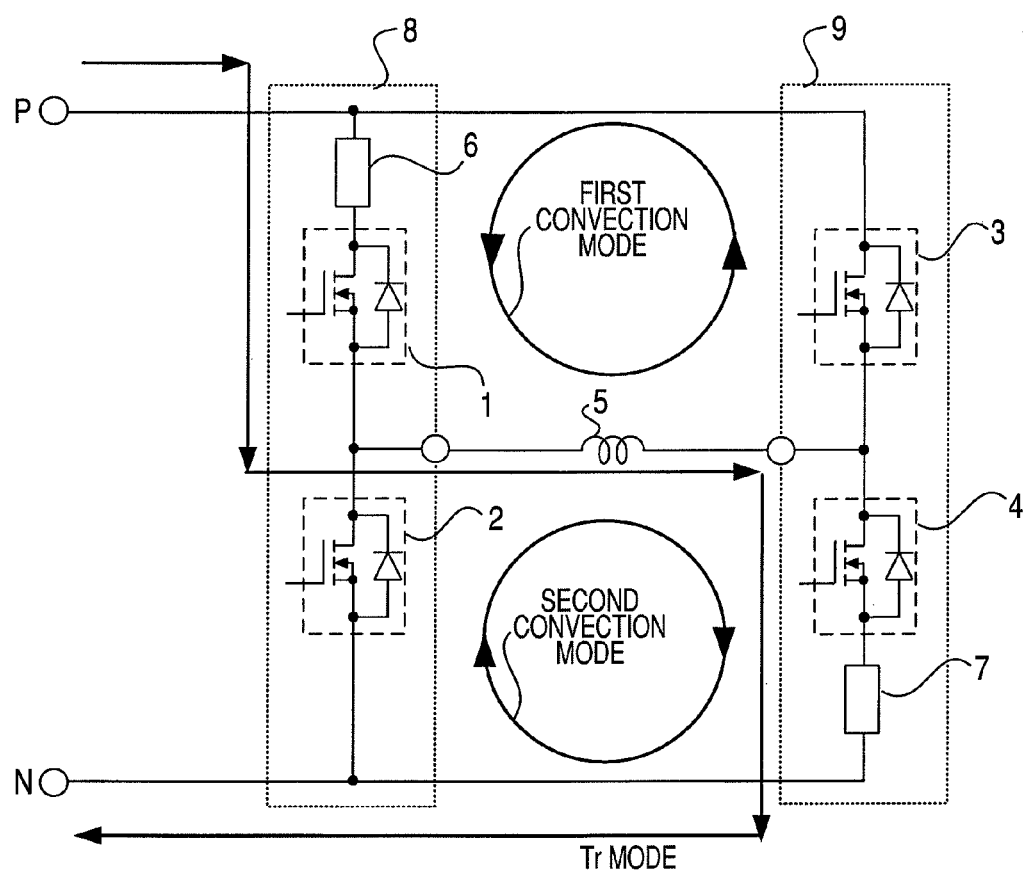
FIG. 2 is a circuit diagram showing a flow of a current according to the embodiment of the present invention.
Figure 3:
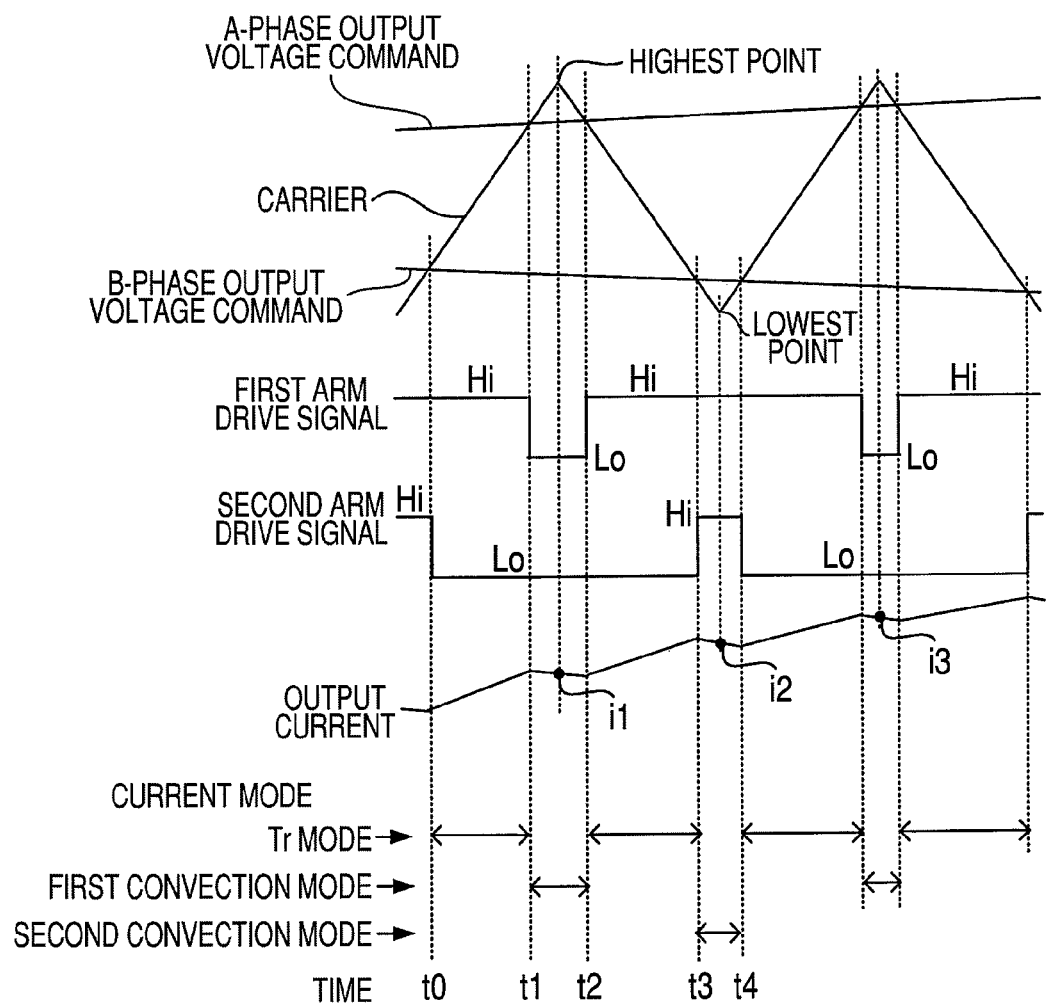
FIG. 3 is a time chart showing a principle of a current detection according to the embodiment of the present invention.
Figure 4:
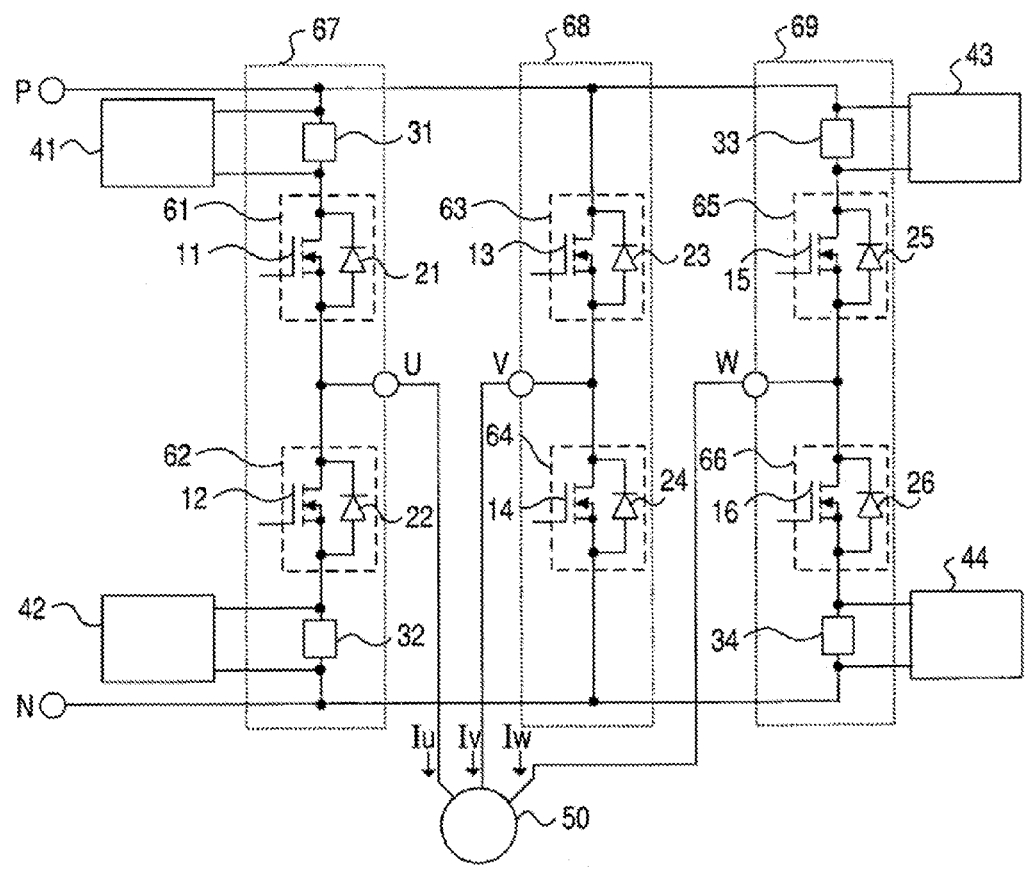
FIG. 4 is a circuit diagram of an inverter according to a first related art.
Figure 5:
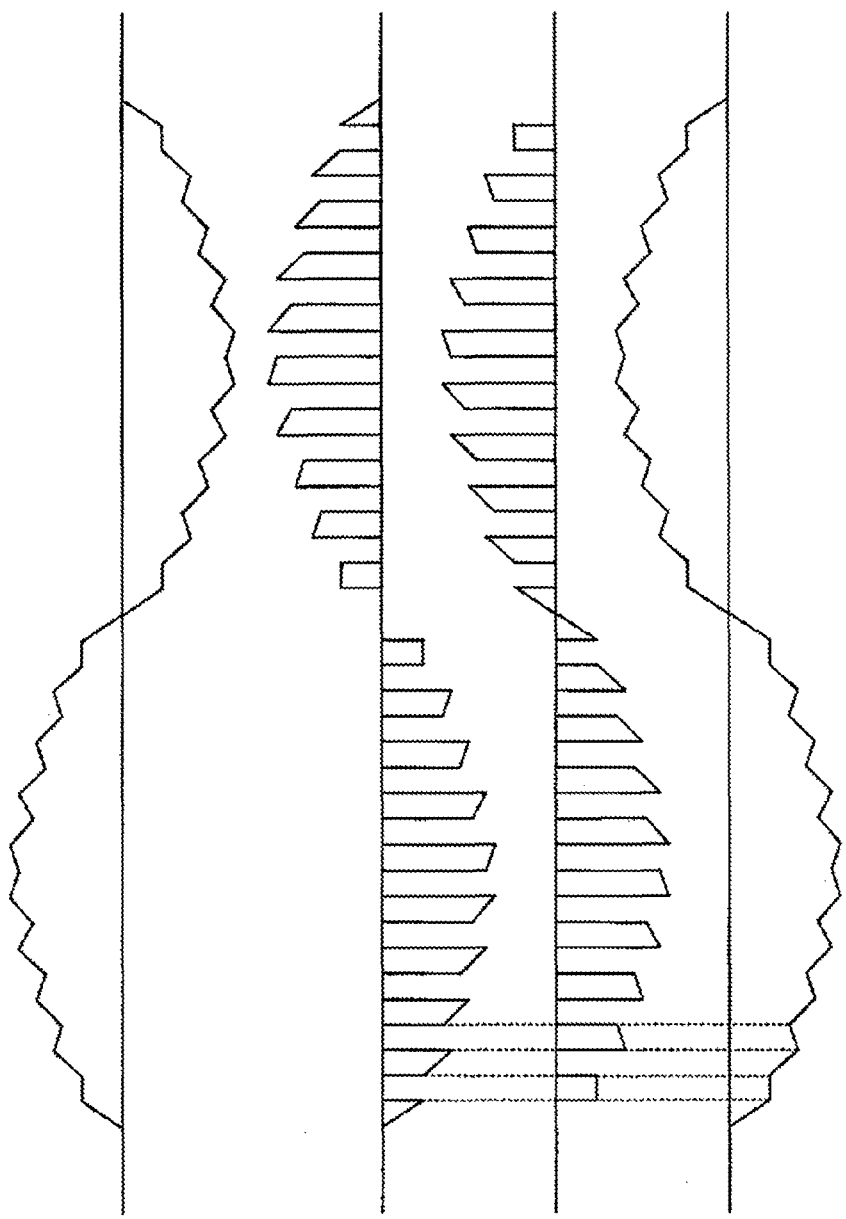
FIGS. 5A to 5D are time charts to describe a current detecting operation according to the first related art.
Figure 6:
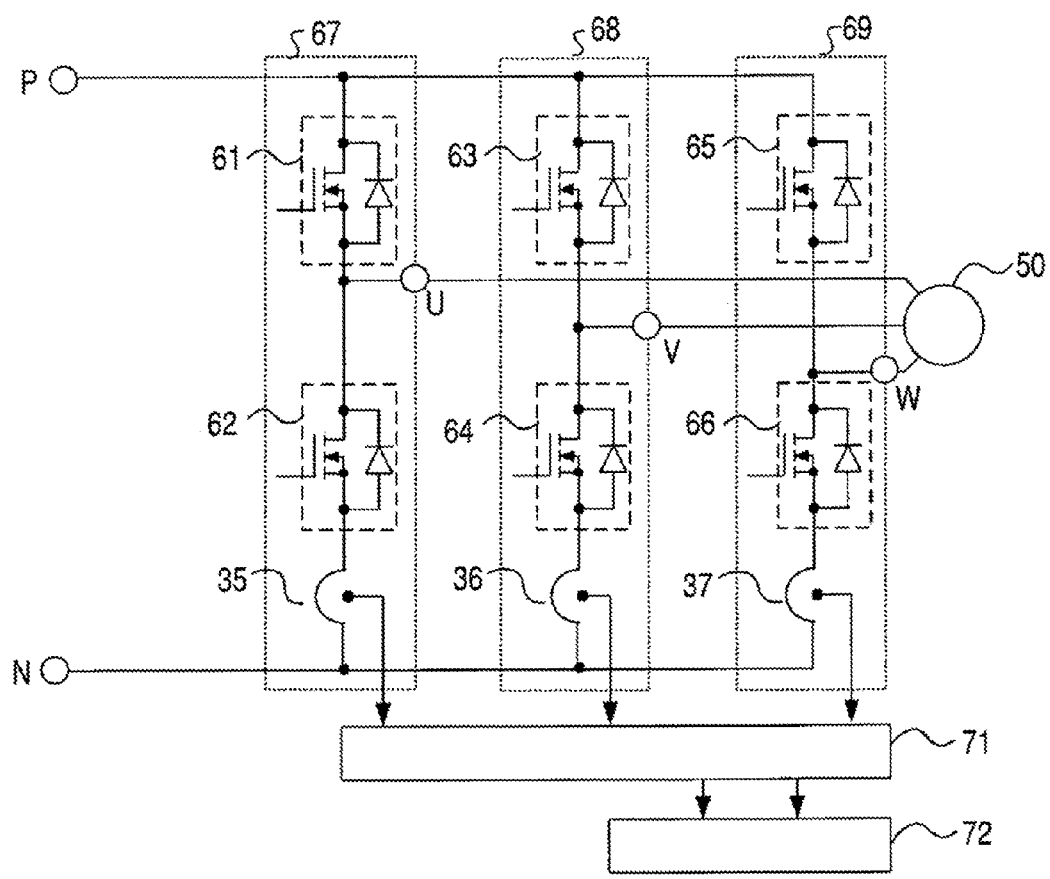
FIG. 6 is a circuit diagram of an inverter according to a second related art.
Figure 7:
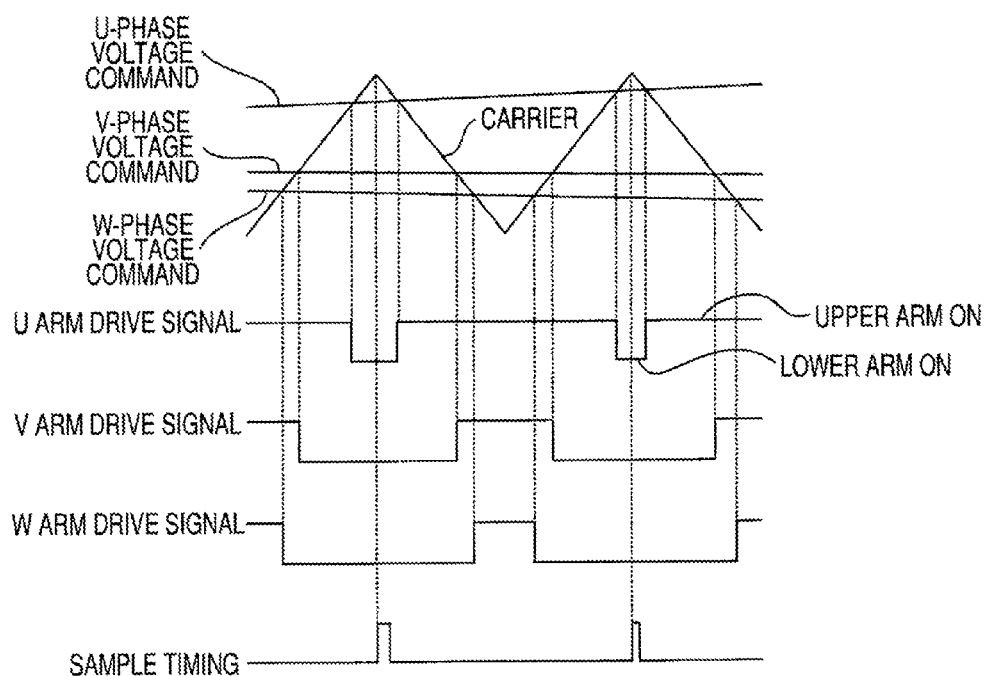
FIG. 7 is an operational waveform diagram showing an operation according to the second related art.

FIG. 2 is a circuit diagram showing a flow of a current of the output inverter for single phase according to the embodiment of the present invention. FIG. 3 is a time chart showing a principle of a current detection of the output inverter for single phase according to the embodiment of the present invention. Description will be given by taking, as an example, the case in which a current is caused to flow from the output terminal A and is led to the output terminal B through the electric load 5.

In FIG. 3, an A-phase output voltage command and a B-phase output voltage command give commands for voltages of the output terminals A and B, and the A-phase output voltage command is compared with a carrier to generate a first arm drive signal and the B-phase output voltage command is compared with the carrier to generate a second arm drive signal.

If the voltage command is greater than the carrier, a switching element on a positive electrode side is turned ON and a switching element on a negative electrode side is turned OFF. If the voltage command is smaller than the voltage of the carrier, the switching element on the positive electrode side is turned OFF and the switching element on the negative electrode side is turned ON.

In FIG. 3, the A-phase output voltage command is greater than the carrier and the B-phase output voltage command is smaller than the carrier at an interval of t0 to t1. In this case, the first arm drive signal is set into an Hi mode in which the semiconductor switching element on the positive electrode side is turned ON and the semiconductor switching element on the negative electrode side is turned OFF, and the second arm drive signal is set into an Lo mode in which the semiconductor switching element on the positive element side is turned OFF and the semiconductor switching element on the negative electrode side is turned ON.

At this interval, accordingly, the semiconductor switching element 11 of the parallel connector 1 of the first arm and the semiconductor switching element 14 of the parallel connector 4 of the second arm are turned ON. Then, a current flows from the positive electrode P of the DC power supply through the parallel connector 1 to the electric load 5 via the output terminal A. Then, the current from the electric load 5 is led into the output terminal B and then the current flows to the negative electrode N of the DC power supply through the parallel connector 4.

Thus, the interval is set into a transistor mode (Tr mode) in which a power is supplied from the DC power supply to the electric load.

At an interval of t1 to t2, both of the first and second arm drive signals are set into the Lo mode. At this time, the semiconductor switching element 11 is turned OFF and the semiconductor switching element 12 is turned ON, and an output current flows from the output terminal A to the output terminal B through the electric load 5 and then returns to the output terminal A from the semiconductor switching element 14 through an N line in a forward direction of the diode 22 of the parallel connector 2.

Thus, the interval is set into a second convection mode in which the current flowing to the electric load flows back through the parallel connecting conductors on the negative electrode side and the negative electrode N of the DC power supply, and the current flowing to the electric load is detected by the second current detector 7.

An interval of t2 to t3 is set into the same drive mode as the interval of t0 to t1 i.e., Tr mode. Thus, the semiconductor switching element 12 is turned OFF and the semiconductor switching element 11 is turned ON.

At an interval of t3 to t4, the first and second arm drive signals are set into the Hi mode. At this time, the semiconductor switching element 14 is turned OFF and the semiconductor switching element 13 is turned ON, and the output current flows from the output terminal A to the output terminal B through the electric load 5 and then returns to the output terminal A through the semiconductor switching element 11 of the parallel connector 1 and a P line on the positive electrode side and a forward direction of the diode 23 of the parallel connector 3.

Thus, the interval is set into a first convection mode in which the current flowing to the electric load flows back through the parallel connecting conductor on the positive electrode side and the positive electrode P of the DC power supply, and the current flowing to the electric load is detected by the first current detector 6.

In the description of the operation, there has been described the case where the output current flows from the output terminal A to the output terminal B. Meanwhile, when the current flows from the output terminal B to the output terminal A, in the Tr mode, the current flows from the positive electrode P of the DC power supply to the output terminal B through the semiconductor switching element 13 of the parallel connector 3 and then flows from the output terminal A to the negative electrode N of the DC power supply through the electric load 5 and the semiconductor switching element 12 of the parallel connector 2.

In the first and second convection modes, moreover, the current flows in an opposite direction to that in the case in which the current flows from the output terminal A to the output terminal B. In both the case where the current flows from the output terminal A to the output terminal B and the case where the current flows from the output terminal B to the output terminal A, however, the current flows to the parallel connectors 1 and 3 in the first convection mode and flows to the parallel connectors 2 and 4 in the second convection mode. By detecting the current of the parallel connectors 1 and 4 or the parallel connectors 2 and 3, accordingly, it is possible to detect the currents in both of the first and second convection modes. In the present embodiment, the current of the parallel connectors 1 and 4 is detected.

Next, description will be given to a method of detecting an output current.

In FIG. 3, i1 denotes a current in the second convection mode when the carrier reaches the highest point at the interval of t1 to t2. Also, i2 denotes a current in the first convection mode when the carrier reaches the lowest point at the interval of t3 to t4. Detection signals in the second convection mode and the first convection mode, which are obtained by the current detector 7 and the current detector 6, are sequentially subjected to sampling using a sampling circuit (not shown) in timing when the carrier reaches the highest point and in timing when the carrier reaches the lowest point.

According to the present invention, one of the two arms of the output inverter for single phase includes the current detector between the positive electrode of the DC power supply and the parallel connector. The other arm includes the current detector between the negative electrode of the DC power supply and the parallel connector. Therefore, it is possible to detect the current in the first convection mode and the current in the second convection mode, which are generated once in one cycle of the carrier, respectively. Namely, the output current can be detected twice in one cycle of the carrier. Therefore, it is possible to perform detection with high precision in a short detecting cycle.

Moreover, it is sufficient that one current detector is provided in each of the arms. Therefore, a structure becomes simple and inexpensive. Since each of the arms includes the current detector, furthermore, it is possible to detect an overcurrent caused by an arm short circuit even if the arm short circuit is generated due to a noise.

INDUSTRIAL APPLICABILITY

The present invention is applicable to a servo drive device for use in a machine tool, a robot or a general industrial machine.

The invention claimed is:

1. An output inverter for single phase, comprising:
a first arm coupled to positive and negative electrodes of a DC power supply, the first arm comprising:
a first parallel connector and a third parallel connector coupled in series, each of the
first and third parallel connectors comprising:
a semiconductor switching element; and
a diode coupled in parallel in a reverse direction with the semiconductor switching element, and
a first current detector directly connected to the first parallel connector and the positive electrode of the DC power supply, wherein the first current detector detects a current in a first convection mode, which flows back through the first parallel connector, and an overcurrent caused by a short circuit of the first arm,
a second arm coupled to the positive and negative electrodes of the DC power supply and coupled in parallel with the first arm, the second arm comprising:
a second parallel connector and fourth parallel connector coupled in series, each of the
second and fourth parallel connectors comprising:
a semiconductor switching element; and
a diode coupled in parallel in a reverse direction with the semiconductor switching element, and
a second current detector directly connected to the second parallel connector and the negative electrode of the DC power supply, wherein the second current detector detects a current in a second convection mode, which flows back through the second parallel connector, and an overcurrent caused by a short circuit of the second arm
wherein an AC output current of the output inverter is detected based only on the current in the first convection mode and the current in the second convection mode
wherein the first current detector is directly connected to the fourth parallel connector, and the second current detector is directly connected to the third parallel connector.

2. A method of detecting a current of an output inverter for single phase, said output inverter comprising:
a first arm coupled to positive and negative electrodes of a DC power supply, the first arm comprising:
a first parallel connector and a third parallel connector coupled in series, each of the first and third parallel connectors comprising:
a semiconductor switching element; and
a diode coupled in parallel in a reverse direction with the semiconductor switching element, and
a first current detector directly connected to the first parallel connector and the positive electrode of the DC power supply,
a second arm coupled to the positive and negative electrodes of the DC power supply and coupled in parallel with the first arm, the second arm comprising:
a second parallel connector and fourth parallel connector coupled in series, each of the second and fourth parallel connectors comprising:
a semiconductor switching element; and
a diode coupled in parallel in a reverse direction with the semiconductor switching element, and
a second current detector directly connected to the second parallel connector and the negative electrode of the DC power supply,
said method comprising:
(a) detecting a current in a first convection mode, which flows back through the first parallel connector coupled to the first current detector, and an overcurrent caused by a short circuit of the first arm, using the first current detector;
(b) detecting a current in a second convection mode, which flows back through the second parallel connector coupled to the second current detector, and an overcurrent caused by a short circuit of the second arm, using the second current detector; and
(c) detecting an AC output current of the output inverter based only on the current in the first convection mode and the current in the second convection mode
wherein the first current detector is directly connected to the fourth parallel connector, and the second current detector is directly connected to the third parallel connector.

3. The method according to claim 2, further comprising:
(d) comparing a first output voltage command for giving a command of a voltage of the first arm with a carrier for generating a PWM signal, thereby generating a first arm drive signal for driving the semiconductor switching element of the first arm;
(e) comparing a second output voltage command for giving a command of a voltage of the second arm with the carrier, thereby generating a second arm drive signal for driving the semiconductor switching element of the second arm; and (f) performing sampling on the current in the first convection mode at the lowest point of the carrier; and (g) performing sampling on the current in the second convection mode at the highest point of the carrier.

* * * * *